United States Patent [19]

Boutillier et al.

[11] Patent Number: 4,908,408

[45] Date of Patent: Mar. 13, 1990

[54] HOT MELT ADHESIVE CONTAINING HYDROXYL-FUNCTIONAL ETHYLENE-VINYL ACETATE AND BLOCKED POLYISOCYANATE

[75] Inventors: Jacques Boutillier, Carsix; Noelle Forichon, Le Neubourge; Yves Lermat, Fontaine l'Abbé, all of France

[73] Assignee: Atochem, Puteaux, France

[21] Appl. No.: 202,103

[22] Filed: Jun. 3, 1988

[30] Foreign Application Priority Data

Jun. 5, 1987 [FR] France .................................. 8707954

[51] Int. Cl.$^4$ ........................ C08L 23/08; C08L 31/04
[52] U.S. Cl. .................................... 525/124; 526/329
[58] Field of Search .......................................... 525/124

[56] References Cited

U.S. PATENT DOCUMENTS

| | | | |
|---|---|---|---|
| 3,808,294 | 4/1974 | Sato et al. | 525/124 |
| 3,931,077 | 1/1976 | Uchigaki et al. | 525/130 |
| 4,404,320 | 9/1983 | Goto et al. | 525/124 |
| 4,410,595 | 10/1983 | Matsumoto et al. | 525/66 |
| 4,839,422 | 6/1987 | McElrath et al. | 525/74 |

FOREIGN PATENT DOCUMENTS

| | | | |
|---|---|---|---|
| 0041192 | 12/1981 | European Pat. Off. | 525/124 |
| 2633385 | 1/1978 | Fed. Rep. of Germany | 525/124 |
| 58-217574 | 12/1983 | Japan | 525/124 |

Primary Examiner—Lewis T. Jacobs
Assistant Examiner—Robert E. Sellers, II
Attorney, Agent, or Firm—Burgess, Ryan and Wayne

[57] ABSTRACT

A composition for a cross-linkable hot melt adhesive is provided and is formed by an ethylene-vinyl acetate copolymer containing primary hydroxyl functions and a blocked polyisocyanate. This composition when associated with a tackifying resin, which can also serve as blocking agent of the polyisocyanate, is a cross-linkable hot melt adhesive. The adhesive is used at a temperature at least equal to splitting temperature of the isocyanate functions of the polyisocyanate. The temperature at which such adhesives retains adherence can reach about 200°–220° C.

6 Claims, No Drawings

HOT MELT ADHESIVE CONTAINING HYDROXYL-FUNCTIONAL ETHYLENE-VINYL ACETATE AND BLOCKED POLYISOCYANATE

FIELD OF THE INVENTION

This invention relates to a composition useful in a cross-linkable hot melt (thermofusible) adhesive and formed by an ethylene-vinyl acetate copolymer containing primary hydroxyl functions and a blocked polyisocyanate. This composition, when, combined with a tackifying (sticky) resin, makes it possible to obtain adherences which are retained at elevated temperatures.

BACKGROUND OF THE INVENTION

Adhesives generally appear in liquid form and solidify after being applied ensuring the bonding of the surfaces to be joined. The solidification habitually results from the polymerization or the polycondensation of the basic components of the adhesive. For several years it has been increasingly sought to provide adhesive compositions also in solid form. The adhesives in this case are hot melts having, as the base, a thermoplastic resin which is solid at room temperature and possessing adhesive properties. These adhesives are liquefied in the molten state by heating, the bonding between the surfaces to be joined being ensured when the adhesive becomes solid upon cooling. These thermofusible adhesives generally result from the combination of two basic constituents: a thermoplastic resin and a tackifying resin which can also include additives such as wasces, stabilizers, fillers, plasticizers, and the like. In the present state, the hot melt adhesives have good adhesive properties but have the disadvantage of exhibiting poor heat resistance, a resistance that does not exceed about 70° to about 80° C. The best known basic thermoplastic resins are the polyamides, the atactic polypropylene and in particular the ethylene-vinyl acetate copolymers.

SUMMARY OF THE INVENTION

This invention relates to a composition for a hot melt adhesive having a good heat resistance, the temperature of resistance of the adherence being capable of reaching from about 200° to about 220° C. The base of this composition is an ethylene-vinyl acetate copolymer having primary hydroxyl functions, hereinafter called EVA for the sake of simplicity, associated with a blocked polyisocyanate. This EVA-polyisocyanate composition is, according to the general rule, completed with a tackifying resin for obtaining the adhesive proper.

DETAILED DESCRIPTION OF THE INVENTION

The EVA used in the composition according to the invention is in fact a copolymer of ethylene and vinyl acetate and an ethylenic monomer having at least one primary hydroxyl function.

This EVA can be obtained in a manner known by grafting on the copolymer of ethylene and of vinyl acetate, the hydroxylated ethylenic monomer. The grafting is conveniently carried out by polymerization in solution, suspension, or in a mass in a molten state. The terpolymer can also be obtained by direct polymerization of three monomers, a known process constituting the most advantageous way.

Among the ethylenic monomers having at least one primary hydroxyl function, there are preferably used: hydroxyethyl acrylate and hydroxyethyl methacrylate, but there can also be used the monomer of the formula

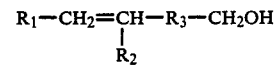

$R_1$ representing a hydrocarbon residue or hydrogen
$R_2$ representing hydrogen or a methyl group
$R_3$ representing an ester, amide or an alkyl group Among these ethylenic monomers, there can be cited by way of example: allylic alcohol, oleilic alcohol, N-hydroxymethyl-acrylamide, and the like.

The EVA composition is a combination by weight related to the initial monomers of from about 45 to 93% ethylene, from about 5 to 40% vinyl acetate and from about 2 to 15% of an ethylenically unsaturated monomer having at least one primary hydroxyl function. EVA preferably contains from about $2 \times 10^{-2}$ to about $15 \times 10^{-2}$ primary OH moles per 100 g of copolymer.

The above described EVA is associated with a blocked polyisocyanate in the composition for adhesive. By polyisocyanate is understood the polyfunctional compounds having at least two —NCO functions per molecule. This polyisocyanate can be selected among the aliphatic, cycloaliphatic, aromatic and/or heterocyclic polyfunctional isocyanates; however, there are preferred diisocyanates such as, among the best known, toluene diisocyanate, diphenyl methane diisocyanate, hexamethyl diisocyanate, and also isophorone diisocyanate. The polyisocyanate is included in the composition in blocked form. By blocked polyisocyanate is understood a polyisocyanate whose —NCO functions are reversibly combined among themselves and/or by means of suitable compounds called blocking agents. There are generally used a blocking agent of the polyisocyanate combinations with active hydrogen; to this effect there are preferably used phenols, alcohols, lactams, oximes, or also secondary amines. By way of example, there can be cited as blocking agents 2-6-di-tert-butyl-4-methyl phenol, 4-tert-butyl-phenol, m-cresol, 4-4'-thio-bis(3-methyl-6-tert-butyl phenol), as well as epsilon caprolactam or benzophenoxime. However, in order to reinforce the subsequent adhesive properties of the combination, it is preferred to use as a blocking agent, a tackifying resin. Said tackifying resin is selected among those having free functions capable of blocking the isocyanate functions. The tackifying resins are in general those having free phenolic functions and more particularly, terpene-phenolic resins. The terpene-phenolic resins, usually have a molecular weight between about 500 and 5,000 and result from the copolymerization of phenolic compounds with terpenic derivatives.

The blocked polyisocyanate is stable at room temperature. It can be admixed with the EVA at an elevated temperature while remaining always at a temperature below that of splitting of the —NCO functions without reaction. It is usefully admixed with the EVA in a proportion such that the ratio of the blocked —NCO of the polyisocyanate to the primary —OH of the EVA is between about 0.1 and 1. This pre-mixture constitutes the composition useful for the cross-linkable hot melt adhesives of this invention. The pre-mixture can be preserved for long periods.

The composition according to the invention, associated with a tackifying resin, gives a hot melt adhesive having an excellent resistance to high temperature. The quantity of tackifying resin in relation to the composition is preferably on the order of from about 0 to 70 portions by weight to about 100 to 30 portions by weight of the composition EVA-blocked polyisocyanate. The tackifying resin imparts to the hot melt adhesive an improved tack. The compounds generally involved are of low molecular weight on the order of from about 400 to about 2500. As indicated by their name, they contribute tack: a property that is due either to the high degree of plasticization of the polymeric composition or to a limited compatibility with the polymeric composition. These tackifying resins, known per se, mainly belong to three large families: the rosins and the hydrogenated, maleinated derivatives thereof ester, terpenic resins and petroleum resins, for example: aliphatic, aromatic modified aliphatic, hydrogenated.

When the polyisocyanate of the composition is blocked by a tackifying resin, it may not be necessary to add a tackifying resin and the composition can be directly used as an adhesive.

However, it is not ruled out in this case, to add to the composition, a tackifying resin identical with, or different from, the one used as blocking agent of the —NCO functions of the polyisocyanate.

It is obviously possible to incorporate into the adhesive the usual additives already cited.

The adhesive obtained is used at elevated temperature, in particular at a temperature of at least about 130° C. The temperature is in fact the one at which the blocked polyisocyanates begin to dissociate releasing their original functions, in other words, the free isocyanate functions re-form by unblocking. The reaction of the isocyanates with the primary hydroxyl functions of EVA produce the cross-linkage of EVA, which has as consequence, a clear improvement of the resistance to temperature of the adhesive in comparison to other known thermofusible adhesives.

The blocking reaction of the isocyanates and the cross-linkage thereof with the hydroxyl groups can be favored by using a catalyst. This catalyst is usually selected from metallic catalysts like the tin salts or also among the tertiary amines like, for instance, the tin dibutyl dilaurate (DLDBSn) or the diazabicyclooctane (DABCO).

The examples that follow illustrate the invention without limiting it.

EXAMPLE 1

In a 2-liter reactor provided with a stirring and heating means, there is prepared a 4-4' Diphenyl methane diisocyanate (MDI) blocked by a tackifying terpene phenolic resin (URAVAR 75205 of DSM). In the following order are introduced:
480 g terpene-phenolic resin 1.3 liter xylene
0.1 liter toluene
75 g MDI A temperature of 60° C. is kept until the complete dissolution of the resin and of the polyisocyanate. The temperature is progressively raised to 120° C. for two hours. After cooling the solution is poured into an aliphatic hydrocarbon. The precipitated product is filtered and then dried under vacuum.

The adhesive composition is prepared in the tank of 60 cm$^3$ of a BRABENDER plastograph with cylinder of the type 50. The components are incorporated in the following order: EVA, the tackifying resin, then the blocked polyisocyanate. The whole is kneaded for 10 minutes at 100° C. eventually in the presence of DLDBSn.

The mixture is deposited between the two aluminium plates. The whole is compressed under a pressure of 0.1 MPa for 5 mm at 160° C. for the tests 1, 3, 7 and at 180° C. for the tests 2, 4, 5.

The adhesive properties are evaluated in accordance with:

T-peel test; standard ASTM D 1876
Lap shear test: standard ASTM D 1002
Shear adhesion failure temperature (S.A.F.T.)

The S.A.F.T. measurement consists in suspending a load of 1 Kg with a test specimen prepared for lap shear test. The whole is placed in a temperature programmed over for a rise of 5° C. per minute. The S.A.F.T. is the temperature at which the bond fails. This measure makes it possible to determine the upper service temperature limit of the adhesive.

EXAMPLE 2

Example 1 is reproduced with an MDI blocked by epsilon caprolactam under the conditions that follow.

In a 1-liter reactor provided with a stirring and heating means there is prepared a 4,4' diphenyl methane diisocyanate (MDI) blocked by the caprolactam.

There are introduced in the following order:
118.65 g caprolactam
95 g ethoxy ethyl acetate.

A temperature of 60° C. is kept until the dissolution of the caprolactam is complete: then the temperature is allowed to descend to room temperature. There is then progressively added under vigorous stirring, the solution of:
131.25 g MDI
394 g 2 ethoxy ethyl acetate.

This is progressively heated to 70° C. until the formation of the blocked isocyanate which precipitates. This precipitate is filtered, washed with hexane, then dried under vacuum at 40° C.

The compressions between the aluminum plates are effected at 160° C. for tests 6, 8 and 9.

The compositions and the results obtained from the tests of the two examples are summarized in the two tables that follow.

TABLE 1

|  | TESTS | |
| --- | --- | --- |
|  | 1<br>COMPARATIVE<br>EVA: 100 g<br>Adhesive composition DERTOPHENE T: 50 g | 2<br>EVA: 100 g<br>DERTOPHENE T: 50 g<br>MDI BLOCK A: 11.3 g<br>DLDBSn: 0.1 g |
| Ratio $\frac{\text{NCO}}{\text{primary OH}}$ | 0 | 0.5 |

TABLE 1-continued

| Adhesive composition | TESTS | |
|---|---|---|
| | 1 COMPARATIVE EVA: 100 g DERTOPHENE T: 50 g | 2 EVA: 100 g DERTOPHENE T: 50 g MDI BLOCK A: 11.3 g DLDBSn: 0.1 g |
| Creep Resistance (S.A.F.T.) in °C. | 80 | 225 |
| Lap Shear Test (MPa) | | |
| at 20° C. | 5.7 | 8.2 |
| at 60° C. | 0.4 | 2.3 |
| at 80° C. | 0.1 | 1.0 |
| T peel test (daN/cm) | | |
| at 20° C. | 1.4 | 3.0 |
| at 60° C. | 0.3 | 0.7 |
| at 80° C. | 0.1 | 0.3 |

EVA: Terpolymer by weight: ethylene 72%, vinyl acetate 23%, hydroxyethyl acrylate 5%
Blocked MDI A: MDI blocked with a terpene phenolic resin
DERTOPHENE T: Terphene phenolic resin of DRT

TABLE 2

| Adhesive composition | TESTS | | | | | | |
|---|---|---|---|---|---|---|---|
| | 3 comparative EVA | 4 EVA 100 g MDI blocked A 5,7 g | 5 EVA 100 g MDI blocked A 22,6 g | 6 EVA MDI 100 g blocked B 2,56 g DLDBSn 0,1 g | 7 comparative EVA 100 g DERTOPHENE T 50 g | 8 EVA 100 g DERTOPHENE T 50 g MDI blocked B 2,5 g DLDBSn 0,1 g | 9 EVA 100 g DERTOPHENE T 50 g MDI blocked B 5,1 g DLDBSn 0,1 g |
| RATIO $\frac{NCO}{\text{primary OH}}$ | 0 | 0,25 | 1 | 0,25 | 0 | 0,25 | 0,5 |
| creep resistance (S.A.F.T.) in °C. | 90 | 145 | >225 | >225 | 80 | 140 | >225 |
| Lap Shear Test (MPa) | | | | | | | |
| at 60° C. | 1,2 | 1,5 | 1,9 | 2,3 | 0,4 | 0,9 | 1,7 |
| at 80° C. | 0,1 | 0,3 | 0,4 | 0,5 | 0,1 | 0,3 | 0,5 |
| T peel test (daN/cm) | | | | | | | |
| at 60° C. | 0,7 | 0,85 | 1,3 | 1,0 | 0,3 | 0,8 | 0,4 |
| at 80° C. | 0,1 | 0,10 | 0,2 | 0,2 | 0,1 | 0,2 | 0,3 |

EVA: Terpolymer by weight: Ethylene 72%, Vinyl acetate 23%, Hydroxyethyl acetate 5%
MDI blocked A: MDI blocked with a terpene phenolic resin
MDI blocked B: MDI blocked with a epsilon caprolactam
DERTOPHENE T: Terpene phenolic resin of DRT

What is claimed:

1. A composition for a cross-linkable hot melt adhesive having a base of ethylene-vinyl acetate copolymer, consisting essentially of a blocked polyisocyanate associated with an ethylene-vinyl acetate copolymer that possesses primary hydroxyl functions contributed by an ethylenic monomer having at least one primary hydroxyl function and wherein said polyisocyanate is blocked by a tackifying resin having free phenolic functions.

2. A composition according to claim 1, wherein said ethylene-vinyl acetate copolymer having primary hydroxyl functions is a combination by weight of from about 45 to 93% ethylene, from about 5 to 40% vinyl acetate and from about 2 to 15 % ethylenically unsaturated monomer possessing at least one primary hydroxyl function.

3. A composition according to either claim 1 or 2, wherein said ethylene-vinyl acetate copolymer having primary hydroxyl functions possesses from about $2 \times 10^{-2}$ to $15 \times 10^{-2}$ moles of primary hydroxyl per 100 g of copolymer.

4. A composition according to either claim 1 or 2, wherein the ratio of the blocked —NCO of the polyisocyanate to the primary —OH of the ethylene-vinyl acetate copolymer is between about 0.1 and 1.

5. A composition according to either claim 1 or 2, wherein said blocked polyisocyanate is mixed with said ethylene-vinyl acetate copolymer having primary hydroxyl functions at a temperature below the splitting temperature of said —NCO functions.

6. A composition according to either claim 1 or 2, wherein said polyisocyanate is blocked by a terpene-phenolic tackifying resin having a molecular weight between about 500 and about 5,000.

* * * * *